Figure 1:
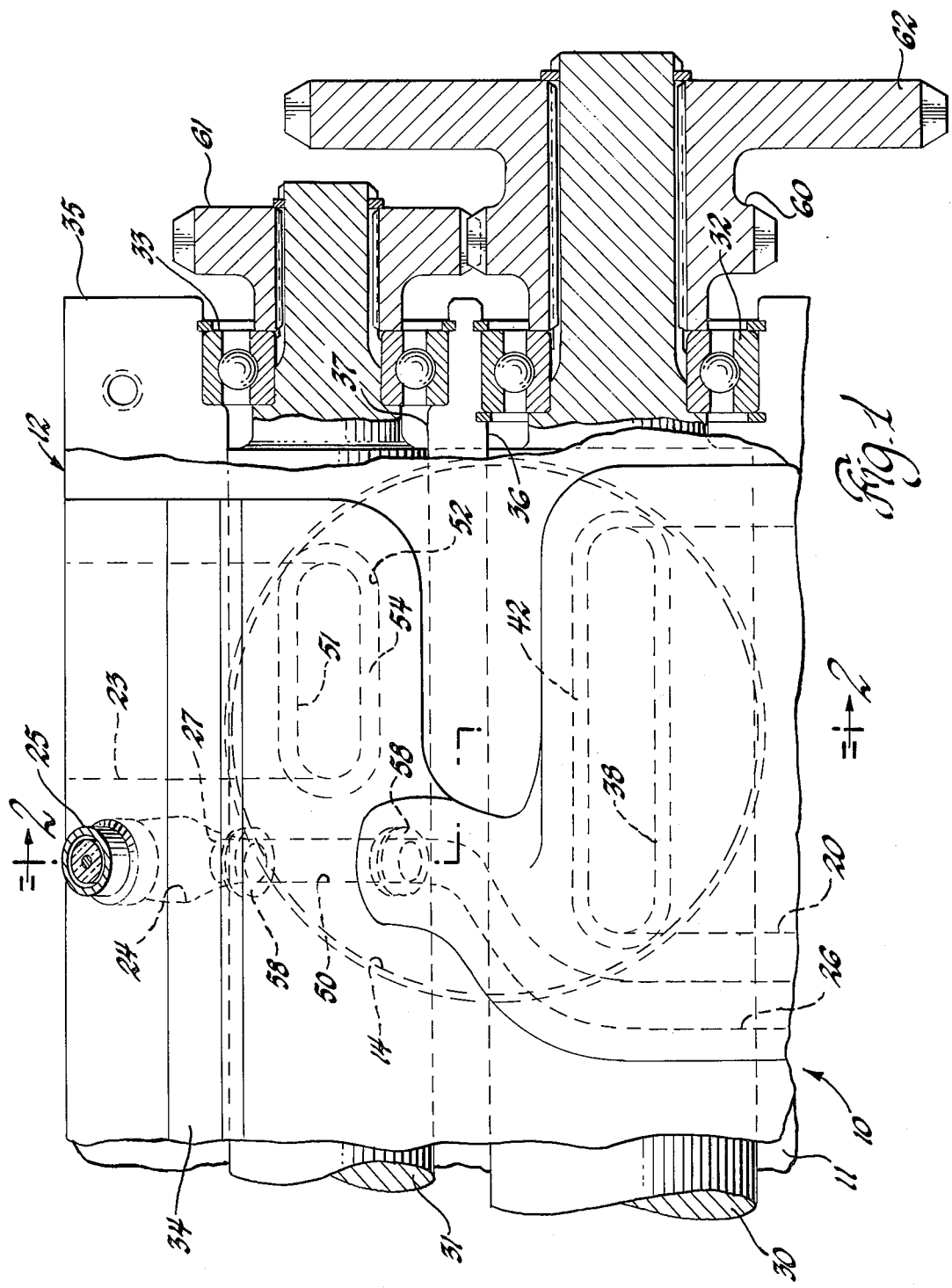

United States Patent [19]
Smith

[11] 3,896,781
[45] July 29, 1975

[54] DUAL ROTARY VALVED INTERNAL COMBUSTION ENGINE

[75] Inventor: George O. Smith, Ferndale, Mich.

[73] Assignee: General Motors Corporation, Detroit, Mich.

[22] Filed: July 10, 1974

[21] Appl. No.: 487,139

[52] U.S. Cl.... 123/190 BD; 123/32 ST; 123/190 A; 123/190 BB
[51] Int. Cl................................................ F01l 7/00
[58] Field of Search...... 123/190 R, 190 A, 190 BB, 123/190 BD, 32 SP, 32 ST, DIG. 4, 127, 75 B

[56] References Cited
UNITED STATES PATENTS

| | | | |
|---|---|---|---|
| 963,600 | 7/1910 | Locke | 123/190 BB |
| 1,775,581 | 9/1930 | Baer | 123/190 BD |
| 2,007,608 | 7/1935 | Kettering | 123/75 B |
| 2,082,231 | 6/1937 | Strickland | 123/190 A |
| 2,183,024 | 12/1939 | Large | 123/190 A |
| 3,730,161 | 5/1973 | Deane | 123/190 BD |

Primary Examiner—Charles J. Myhre
Assistant Examiner—Daniel J. O'Connor
Attorney, Agent, or Firm—Arthur N. Krein

[57] ABSTRACT

An internal combustion engine having a pre-combustion chamber associated with each combustion cylinder of the engine is provided with dual rotary valves including a first rotatable valve shaft with flow passages extending radially therethrough which is used to control the flow of a lean induction mixture directly to each cylinder and, a second rotatable valve shaft with pairs of flow through passages therein, one of the passages acting to control the intake of a rich induction mixture into the pre-combustion chamber of a cylinder, while the other passage controls the flow of exhaust gas from the cylinder, the valve shaft being geared together to be driven at a predetermined speed relative to the crankshaft speed.

4 Claims, 2 Drawing Figures

DUAL ROTARY VALVED INTERNAL COMBUSTION ENGINE

This invention relates to rotary valve type internal combustion engines and, in particular, to an internal combustion engine having a pre-combustion chamber associated with each combustion chamber with dual rotary valves for these chambers.

Various forms of internal combustion engines have been proposed in the past utilizing one or more rotary valves therein for controlling the flow of gases through the intake and exhaust passages of the engine. In these engines, whether using a pair of rotary valves, one for controlling intake and one for controlling discharge, or a common rotary valve for controlling both intake and discharge, valve shaft seizure and sealing problems have limited the acceptability of such rotary valves in engines. In addition, none of the known rotary valve arrangements of the prior art for use in engines have been designed for use in an engine having both combustion and precombustion chambers associated therewith.

It is therefore a primary object of this invention to provide an improved internal combustion engine having a precombustion chamber associated with each cylinder of the engine and having dual rotary valves whereby a different air-fuel mixture can be supplied to the pre-combustion chamber than that supplied to the combustion chamber with one of the valve elements being provided with passages to serve as both the intake valve to a chamber and as an exhaust valve for the chamber.

Another object of this invention is to provide an internal combustion engine with an improved rotary valve arrangement for the pre-combustion chamber and the combustion chamber of each cylinder of the engine, the rotary valves being used to control different induction mixtures to the pre-combustion chamber and to the chamber with one of the valves also being used to control the flow of exhaust gases from the combustion chamber.

A still further object of this invention is to provide an improved rotary valve arrangement for an internal combustion engine.

These and other objects of the invention are obtained by the use of a dual rotary valve system in a spark ignition internal combustion engine having a pre-combustion chamber associated with each cylinder, the dual rotary valve system including a first valve shaft rotatably journalled in the cylinder head of the engine with a flow passage extending radially therethrough which is used to control flow of a lean induction mixture from an induction passage directly to a cylinder and a second valve shaft, provided with a pair of flow through passages therein, one of the passages acting to control the intake of a rich induction mixture from a second induction passage into the pre-combustion chamber associated with the cylinder while the other passage in this second valve shaft controls the flow of exhaust gases from the cylinder, the two valve shafts being geared together and are driven, if used in a four cycle engine, at one-quarter of the rotational speed of the crankshaft of the engine.

Figure 2:
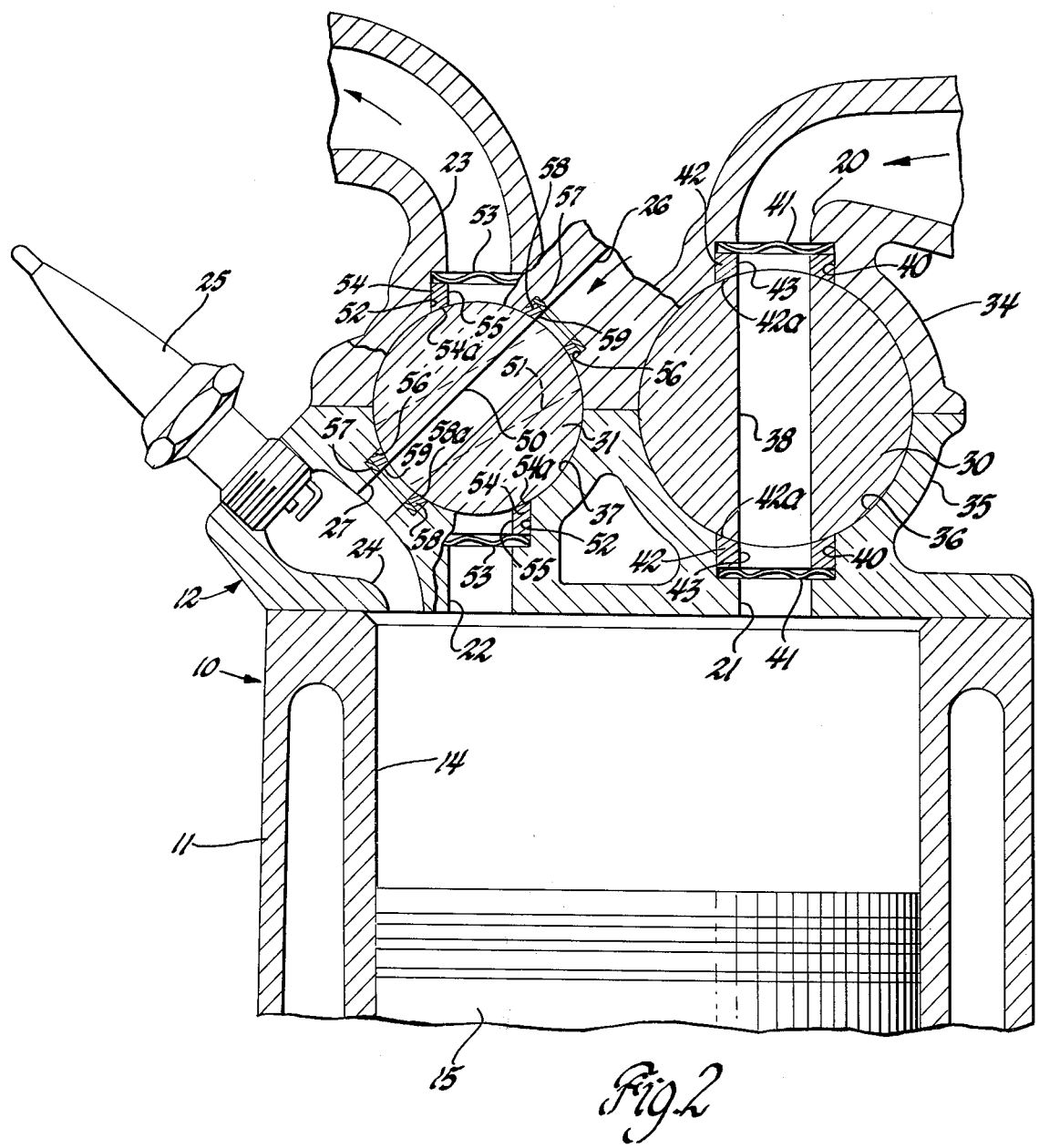

For a better understanding of the invention, as well as other objects and further features thereof, reference is had to the following detailed description of the invention to be read in connection with the accompanying drawings, wherein:

FIG. 1 is a top view, partly in section, of a portion of a bank of cylinders of a dual rotary valved, spark ignition internal combustion engine constructed in accordance with the invention, with only those parts of the engine being shown which are essential for an understanding of the present invention; and, FIG. 2 is a sectional view of the engine taken along line 2—2 of FIG. 1.

With reference to the figures, there is shown a spark ignition internal combustion engine 10 having a housing including a cylinder block 11 on which is mounted a cylinder head, generally designated 12. The cylinder head 12 is provided with one or more combustion cylinders 14, each of which has a piston 15 mounted therein for reciprocal movement, each piston 15 being connected in a conventional manner by a piston rod to the crankshaft, both not shown, of the engine. Piston 15, cylinder 14 and the cylinder closing surface of the cylinder head 12 form a variable volume combustion chamber of the engine.

Cylinder head 12 is provided with an intake manifold including an induction passage 20 terminating at an intake port passage 21 opening into the cylinder 14 for supplying a lean air-fuel mixture to the combustion chamber and with an exhaust port 22 and an exhaust passage 23 from the cylinder, these passages being provided for each cylinder of the engine. An auxiliary or pre-combustion chamber 24, which receives the electrode of the spark plug 25, is also provided in the cylinder head 12 for each cylinder of the engine, with the pre-combustion chamber 24 opening into the cylinder 14 with which it is associated. A separate intake passage 26 terminating in a port passage 27 opening into the pre-combustion chamber 24 is provided in the cylinder head 12 for each of the pre-combustion chambers 24. Induction passage 20 and intake passage 26 are operatively connectable either to two separate carburetors, not shown, or to separate throats, for example, of a triple-throat down draft carburetor, not shown, whereby a lean induction mixture can be supplied to the combustion chamber via induction passage 20 while a rich induction mixture is supplied to the pre-combustion chamber 24 via intake passage 26.

In accordance with the subject invention, the flow of the lean induction mixture to the combustion chamber of a cylinder 14, the flow of a rich induction mixture to each pre-combustion chamber 24 and exhaust flow from each cylinder 14 is controlled by a set of dual rotary valves for each bank of cylinders of the engine, each set of the rotary valves including valve shafts 30 and 31 rotatably journalled in spaced apart relation in bores 36 and 37, respectively, in the cylinder head 12, in a suitable manner, as by bearings 32 and 33, respectively, on the reduced ends of the shafts, the shafts 30 and 31 extending longitudinally of the engine.

In the embodiment shown, the valve shaft 30 is used to control the flow of an induction mixture to the combustion chamber or ccylinder while the valve shaft 31 is used to control the flow of an induction mixture to the pre-combustion chamber 24 and to control the flow of exhaust gases from the combustion chamber.

As best seen in FIG. 2, the cylinder head 12, for a purpose which will become apparent, is formed in two parts suitably secured together to form the unitary cylinder head 12 structure and includes an upper housing 34 having the induction passages 20 and 26 together with the exhaust passage 23 therein and a lower housing 35 having the intake ports 21 and 27, pre-combustion chamber 24 and the exhaust port 22 for each cylinder in a bank of cylinders of the engine.

As a unitary structure, the cylinder head 12 is provided with longitudinal extending, transversely spaced apart, cylindrical bores 36 and 37 rotatively receiving the valve shafts 30 and 31, respectively, the axes of the bores 36 and 37 preferably lying in the joint plane of the housing elements 34 and 35 and extending longitudinally thereof. Bore 36 intersects each induction passage 20 in the upper housing 34 and the intake port passage 21 in the lower housing 35 for each cylinder whereby flow from the induction passages 20 to the intake port 21 for each cylinder can be controlled by rotation of the valve shaft 30 in the bore 36, the valve shaft 30 being provided with a radial through passage 38 for each cylinder. The passage 38 when aligned with the induction passage 20 and the intake port passage 21 associated therewith permits fluid flow from the induction passage 20 to the intake port passage 21.

The induction passage 20 in the upper housing 34 and the intake port passage 21 in lower housing 35 for each cylinder are each counter-recessed as at 40 adjacent to the bore 36 to slidably receive a spring 41 biased apertured insert 42 having an arcuate valve seat 42a formed complementary to the valve shaft 30. Each insert 42 extends axially along the rotary valve 30 to overlie a passage 38 therein, the insert being provided with a central aperture 43 formed complementary to the radial passage 38, which in turn is formed complementary to the induction passage 20 and the intake port passage 21. Spring 41 is shown as being a waved type spring washer of substantially rectangular configuration.

In a similar manner, bore 37 intersects the induction passage 26 and exhaust passage 23 in upper housing 34 for each cylinder and the intake port passage 27 and exhaust port passage 22 in the lower housing 35 for each cylinder and, the valve shaft 31 journalled in this bore is provided with a radially extending intake passage 50 and exhaust passage 51 axially spaced apart from each other and aligned with the respective induction passage 26 and intake port passage 27 and, with the exhaust passage 23 and exhaust port passage 22, respectively, for cooperation therewith. Each set of these passages has the intake passage 50 angularly displaced relative to the exhaust passage 51 in the shaft 31, as desired, to effect the proper timed intake and exhaust for each cylinder 14 of the engine in the firing order of the cylinders, as desired. In this regard, it should be realized that the various positions of the passages in the valve shafts 30 and 31 and of the piston 15 shown are for purposes of illustration only and should not be construed as illustrating the relative position of these elements for proper intake and exhaust timing relative to the cylinder shown.

Each exhaust passage 23 in the upper housing 34 and each exhaust port passage 22 in lower housing 35 is counter-recessed as at 52 adjacent bore 37 to slidably receive a spring 53 biased valve seat insert 54, each of which is provided with an arcuate valve seat 54a formed thereon complementary to the valve shaft 31. Each insert 54, with a central aperture 55 therethrough, extends axially of the valve shaft 31 in position to overlie the exhaust passage 51 with which it cooperates so that a flow through connection between the exhaust port 22 and exhaust passage 23 is established during each half rotation of the shaft. Exhaust passages 23, 22 and 51 and the aperture 55 in the insert 54 are preferably formed complementary to each other. Spring 53 is shown as a waved spring washer similar to spring 41, previously described.

Each induction passage 26 in upper housing 34 and each intake port passage 27 in the lower housing 35 is also counterbored as at 56 to slidably receive a spring 57 biased valve seat insert 58, each valve seat insert 58 being provided with an arcuate valve seat surface 58a formed complementary to the valve shaft 31. Each valve seat insert 58 is also provided with the central aperture 59 of a size corresponding to the intake passage 50 in the valve shaft 31 and, of course, corresponding to the induction passage 26 and the intake port passage 27. Spring 57, in the embodiment shown, is in the form of a conical spring washer. Although the inserts 58 are shown as being of annular configuration, it will be apparent that they could be formed in another shape in order to prevent their possible rotation, if desired, to maintain proper alignment of their valve seats with the outer periphery of shaft 31 with which they cooperate.

By using opposed sets of spring biased valve seat inserts on the valve shafts 30 and 31, circumferential fluid leakage around the rotary valve shafts, as well as axial fluid leakage along these shafts, is greatly reduced. In addition, the inserts can be made of a different material than used in fabrication of the head 12.

In the embodiment illustrated, the rotary valve shafts 30 and 31, serving any number of cylinders in a bank of cylinders, are rotated in unison but in opposite directions with respect to each other as by the gears 60 and 61 fixed to the shafts 30 and 31, respectively, for engagement with each other. In the case of a four cycle engine and with the singular passage arrangements shown in these shafts for a cylinder, the shaft could be driven through the gear 62 fixed to the shaft 30, for example, at one-fourth the speed of rotation of the engine crankshaft, not shown, in a well known manner. The direction of rotation of the valve shafts 30 and 31 can be as desired and would, of course, depend on the position of the passages therethrough used to control the dual intake and exhaust for a cylinder and pre-combustion chamber in the manner previously described. It will, however, be apparent that the speed of rotation of these shafts could be varied, as desired, depending on the number of control passages provided in these shafts to control fluid flow to a single cylinder and pre-combustion chamber of the engine.

It will be apparent that the dual rotary valve, as described, will permit added freedom in a pre-combustion chamber and in a combustion chamber contour design to obtain more efficient gas distribution and, in addition, this dual rotary valve arrangement offers a convenient method of incorporating dilute combusiton in an engine, that is, by providing a rich induction mixture to a pre-combustion chamber while supplying a lean induction mixture to the main combustion chamber associated therewith of the engine.

It will be apparent that for an inline engine, only one set of dual rotary valves would be required to serve all of the cylinders of the engine, but that in the case of a V-type engine, two sets of dual rotary valves would be used, each set of valves serving one bank of cylinders of the engine.

What is claimed is:

1. In an internal combustion engine, a housing means having at least one cylinder arrangement therein comrpising a combustion chamber and a pre-combustion chamber in communication with said combustion chamber, said housing means having a first fuel and air supply passage means extending to said combustion chamber, a second fuel and air supply passage means extending to said pre-combustion chamber, and an exhaust passage means extending to said combustion chamber, a first valve shaft rotatably journalled in said housing in position to intersect said first fuel supply passage means whereby to control the flow of fluid therethrough and having at least one radial extending passage therethrough axially positioned therein for alignment with said first fuel supply passage means, a second valve shaft rotatively journalled in said housing means in position to intersect said second fuel supply passage means and said exhaust passage means, said second shaft having a radially extending first passage therethrough and a radially extending second passage therethrough axially spaced from said first radially extending passage, said first passage being positioned for alignment with said second fuel supply passage means and said second passage being positioned for alignment with said exhaust passage means and, drive means operatively connected to said first valve shaft and to said second valve shaft to effect synchronous rotation of said first valve shaft relative to said second valve shaft in timed relation to the operation of said engine.

2. In an internal combustion engine according to claim 1, wherein said first fuel and air supply passage means and wherein said second fuel and air supply means and said exhaust passage means in said housing means are each enlarged to provide a recess adjacent to and on diametrically opposite sides of said first valve shaft and said second valve shaft, respectively, a spring and an apertured valve seat insert slidably positioned in each of said recesses,, each said spring being positioned to bias said valve seat insert with which it is associated into sealing engagement against the one of said shafts with which it cooperates.

3. In an internal combustion engine, a housing means having at least one cylinder arrangement therein comprising a combustion chamber and a pre-combustion chamber in communication with said combustion chamber, said housing means further including therein a first induction passage means including a first rotatable valve controlling flow therethrough, said first induction passage means connecting at one end to said combustion chamber and at its other end being connectable to a first source of induction fluid, a second induction passage means and an exhaust passage means including a second rotatable valve controlling flow through both said second induction passage means and said exhaust passage means, said second induction passage means being connected at one end to said pre-combustion chamber and at its other end being connectable to a second source of induction fluid, said exhaust passage means being in communication with said combustion chamber, said first rotatable valve including a first shaft rotatably journalled in a first cylindrical bore in said housing means and extending longitudinally of the engine above said cylinder arrangement, said first valve shaft having a radially extending passage therethrough positioned whereby upon rotation of said first valve shaft, when said passage is in alignment with said first induction passage means, will permit flow therethrough and when out of alignment therewith said valve shaft will block flow therethrough, said second rotatable valve including a second valve shaft rotatably journalled in a second cylindrical bore in said housing means extending longitudinally of said engine above said cylinder arrangement, said second valve shaft having axially, spaced apart, radially extending first and second passages therethrough positioned to control the flow through said second induction passage means and said exhaust passage means, respectively, and drive means operatively connected to said first shaft and to said second shaft and to said engine to effect rotation of said first shaft and said second shaft in unison with each other and at a speed directly related to the rotational speed of the engine.

4. In an internal combustion engine, a housing means having at least one inline arrangement of cylinders each comprising a combustion chamber and a pre-combustion chamber, a spark plug means for each of said cylinders, each of said spark plug means having its electrode in communication with said precombustion chamber for said cylinder, a first induction passage means in said housing means for each of said cylinders in communication at one end with said combustion chamber of said cylinder and connectable at its opposite end to a first source of induction fluid, a cylindrical first bore in said housing means positioned to intersect each of said first induction passage means intermediate the ends thereof, a first valve shaft with a radial through passage therein for each of said first induction passage means rotatably journalled in said first bore for sequentially controlling the flow of induction fluid through said first induction passage means upon rotation of said valve shaft, a second induction passage means for each of said cylinders in said housing means with each extending at one end from said precombustion chamber of said cylinder and being connectable at its opposite end to a second source of induction fluid, exhaust passage means in said housing for each of said cylinders in communication with said combustion chamber of said cylinder, a cylindrical second bore in said housing means positioned to intersect each of said second induction passage means and each of said exhaust passage means, a second valve shaft with a radial through passage therein for each of said second induction passage means and a radial through exhaust passage therein for each of said exhaust passage means rotatably journalled in said second bore to control, upon rotation of said second shaft, induction fluid flow through said second passage means and exhaust flow through said exhaust passage means and, drive means operatively connected to said first valve shaft and to said second valve shaft to effect synchronous rotation of said first valve shaft relative to said second valve shaft in timed relation to the operation of said engine.

* * * * *